(12) United States Patent
Nishimura

(10) Patent No.: US 6,961,189 B2
(45) Date of Patent: Nov. 1, 2005

(54) LENS BARREL HAVING A BUILT-IN CAM MECHANISM

(75) Inventor: Syunji Nishimura, Saitama (JP)

(73) Assignee: Fujinon Corporation, Saitama (JP)

( * ) Notice: Subject to any disclaimer, the term of this patent is extended or adjusted under 35 U.S.C. 154(b) by 24 days.

(21) Appl. No.: 10/812,168

(22) Filed: Mar. 30, 2004

(65) Prior Publication Data

US 2004/0190160 A1    Sep. 30, 2004

(30) Foreign Application Priority Data

Mar. 31, 2003 (JP) .............................. 2003-093411

(51) Int. Cl.⁷ .......................... G02B 15/14; G02B 7/04
(52) U.S. Cl. ..................... 359/699; 359/700; 359/701; 396/144
(58) Field of Search ................................. 359/694, 695, 359/696, 699, 700, 701; 396/144, 439

(56) References Cited

U.S. PATENT DOCUMENTS

| | | | |
|---|---|---|---|
| 5,469,300 A * | 11/1995 | Nomura | 359/700 |
| 5,731,913 A * | 3/1998 | Imanari | 359/700 |
| 5,867,740 A | 2/1999 | Hamasaki | 396/144 |
| 6,195,212 B1 * | 2/2001 | Miyamoto | 359/699 |
| 6,657,795 B2 * | 12/2003 | Nishimura et al. | 359/699 |
| 6,747,809 B2 * | 6/2004 | Yasutomi | 359/699 |
| 2004/0051972 A1 * | 3/2004 | Nomura | 359/701 |
| 2004/0228006 A1 * | 11/2004 | Yasutomi et al. | 359/699 |

FOREIGN PATENT DOCUMENTS

JP    4-343309    11/1992

* cited by examiner

*Primary Examiner*—Loha Ben
(74) *Attorney, Agent, or Firm*—Young & Thompson

(57) ABSTRACT

Sliders of a movable lens holder are provided with cam followers respectively. Each of the sliders engages with a guide opening formed in a lens frame so that the movable lens holder is allowed to move in an optical-axis direction. The movable lens holder is retained in a cam barrel provided with cam grooves, which are formed so as to shift their positions in the optical-axis direction and in a rotational direction of the cam barrel. The cam followers engage with the cam grooves respectively.

9 Claims, 7 Drawing Sheets

LENS BARREL HAVING A BUILT-IN CAM MECHANISM

BACKGROUND OF THE INVENTION

1. Field of the Invention

The present invention relates to a lens barrel having a built-in cam mechanism for moving a lens in an optical-axis direction.

2. Description of the Related Art

A lens barrel having a built-in cam mechanism is known. The cam mechanism is for moving a lens in an optical-axis direction. The lens is moved in association with zoom adjustment and focus adjustment by a motor drive or a rotational operation. The lens barrel comprises a cam barrel and a movable barrel. The cam barrel is formed with a cam groove, and the movable barrel has a cam follower for engaging with the cam groove. When the cam barrel is rotated around a barrel axis thereof, displacement of the cam groove is transmitted to the cam follower. Thereupon, the cam follower guided in an axis direction moves the movable barrel straightly so that the lens held by the movable barrel is moved along the optical axis.

In general, are provided plural pairs of the cam grooves and the cam followers so as to move the movable barrel smoothly and stably. When two pairs of the cam grooves and the cam followers are provided, for example, the cam follower is arranged at intervals of 180 degrees in a rotational direction of the cam barrel. When three pairs of the cam grooves and the cam followers are provided, for example, the cam follower is arranged at intervals of 120 degrees. The cam followers are arranged at even intervals on the identical circle. In case the lens barrel has two cam followers, the movable barrel is likely to fall down if the cam followers straightly arranged work as a rotary shaft. In view of this, it is preferable to provide three pairs of the cam grooves and the cam followers. Regarding prior art for preventing the movable barrel from falling down, is known a lens barrel in which there are cam grooves and cam followers arranged along the optical-axis direction in addition to the cam grooves and the cam followers arranged along the rotational direction of the cam barrel (see Japanese Patent Laid-Open Publication No. 4-343309, which is Japanese counterpart of U.S. Pat. No. 5,867,740).

In recent years, optical devices are improved so as to be more compact. Consequently, the lens barrel is downsized. With respect to the lens barrel having a small diameter, when a rotational amount of the cam barrel is large relative to a movement amount of the movable barrel, there arises a problem in that plural cam grooves partially overlap with each other. In the case three pairs of the cam grooves and the cam followers are provided or in the case the plural cam grooves are provided such as described in the above-noted Patent Publication, a width of the cam groove becomes narrow for the purpose of preventing the cam grooves from interfering with each other. The narrow cam groove impedes stable drive of the cam mechanism.

SUMMARY OF THE INVENTION

In view of the foregoing, it is a primary object of the present invention to provide a lens barrel in which a plurality of cam grooves having a small inclination are prevented from interfering with each other.

In order to achieve the above and other objects, the lens barrel according to the present invention includes a cam barrel to be rotated around an optical axis. The cam barrel is provided with a plurality of cam grooves having an identical configuration. Positions of the cam grooves are shifted in an optical-axis direction and in a rotational direction of the cam barrel. A movable member is provided with a plurality of cam followers respectively engaging with the cam grooves. When the cam barrel is rotated, a guide member guides the cam follower in the optical-axis direction without rotating it.

According to the lens barrel of the present invention, even if a rotating amount of the movable member is comparatively large relative to a moving amount thereof, interference of the cam grooves may be easily avoided without enlarging a size of the lens barrel.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE

Preferred Embodiment(s)

Figure 1:
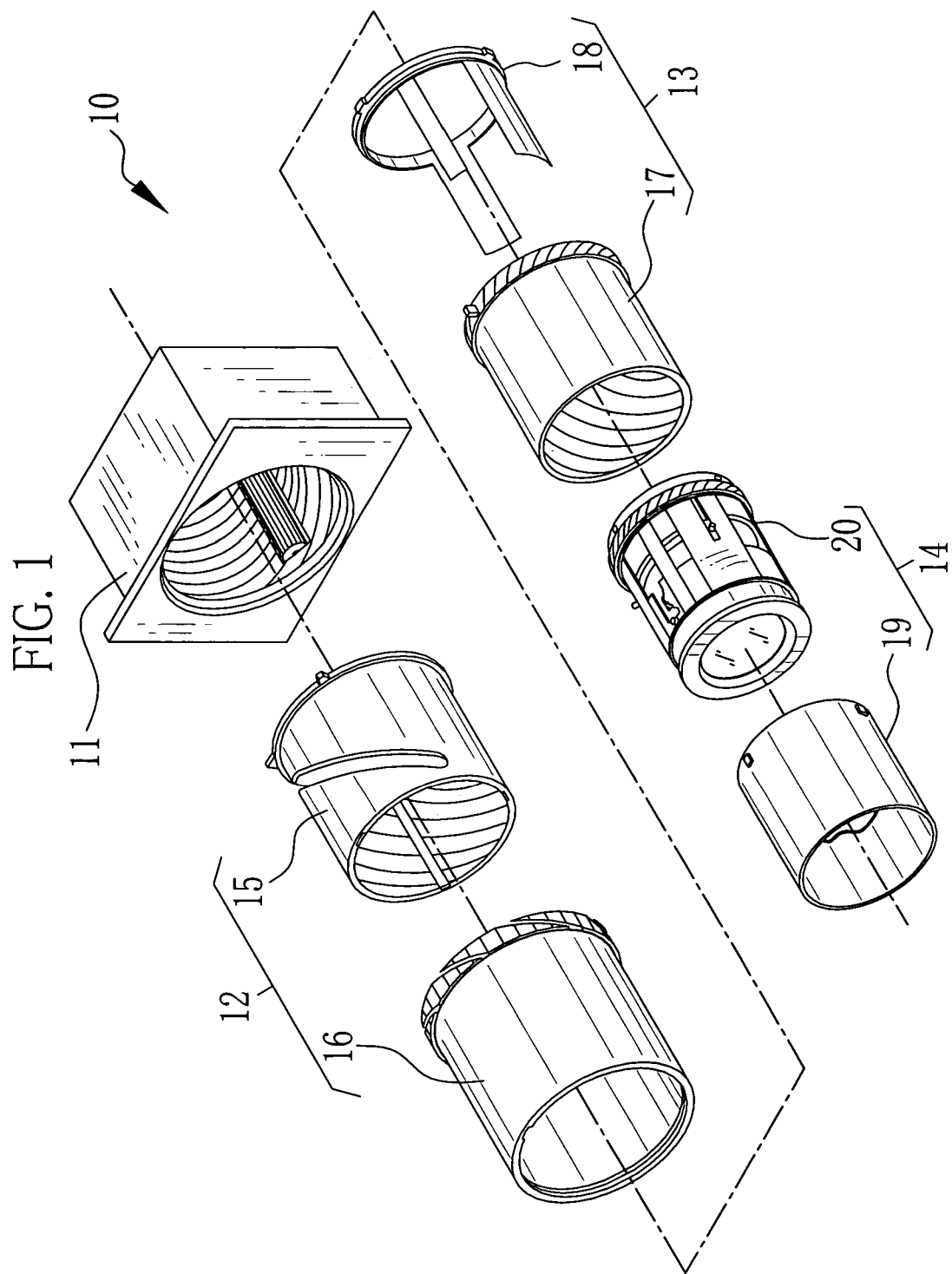
FIG. 1 is an exploded perspective view showing a zoom lens.

In FIG. 1, a lens barrel 10 is constituted of a fixed barrel 11, a rear barrel 12, a middle barrel 13 and a front barrel 14. The rear barrel 12, the middle barrel 13 and the front barrel 14 are moved relative to the fixed barrel 11 when changing a magnification. The rear barrel 12 comprises a linear-movement barrel 15 and a rear rotational barrel 16. The middle barrel 13 comprises a middle rotational barrel 17 and a linear-movement guide member 18. The front barrel 14 comprises a cam barrel 19 and a leading barrel 20 containing a zoom lens.

Figure 2:
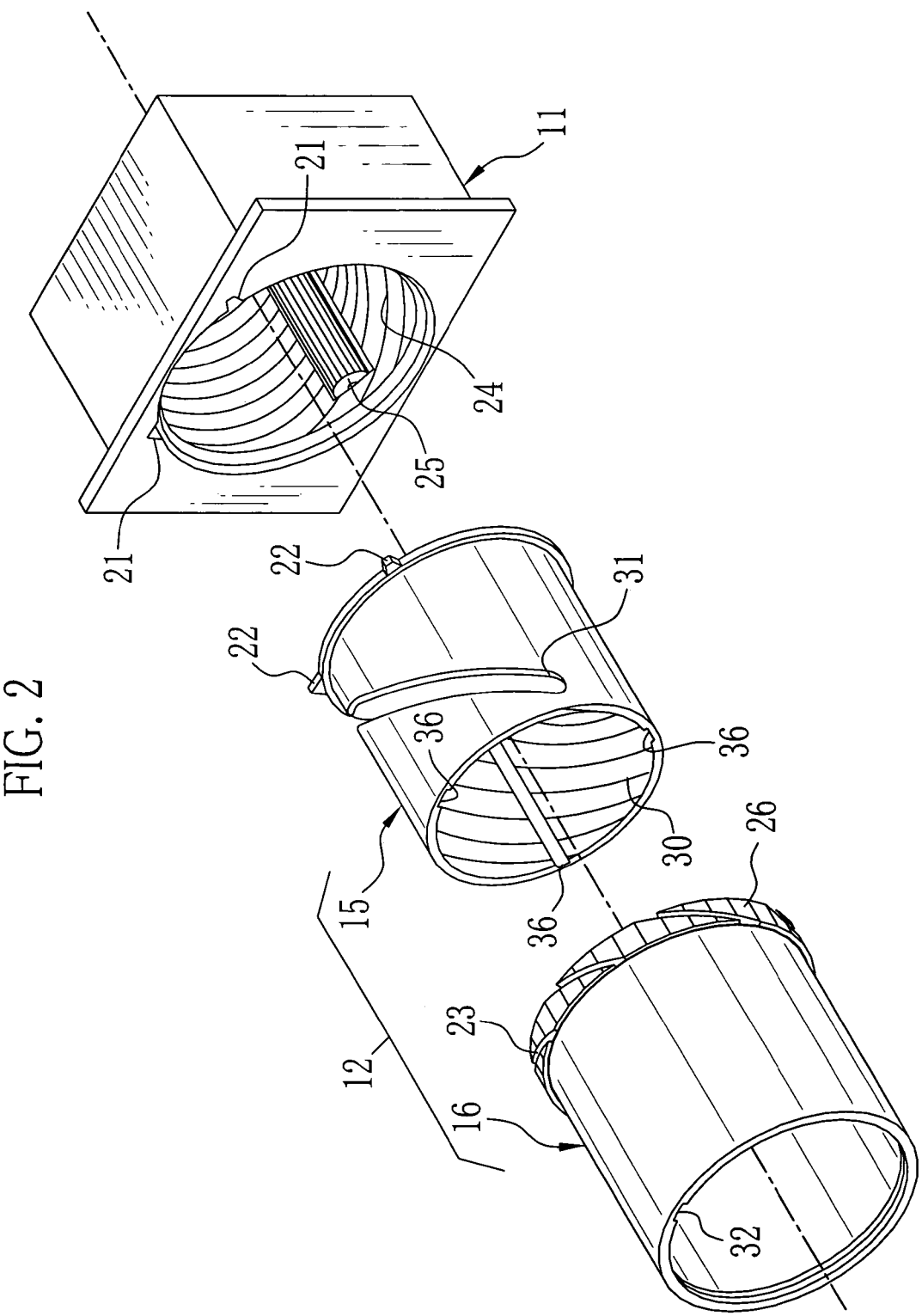
FIG. 2 is an exploded perspective view showing a fixed barrel and a rear barrel.

In FIG. 2, the fixed barrel 11 is provided with key grooves 21, and the linear-movement barrel 15 is provided with key projections 22 for engaging with the key grooves 21. The linear-movement barrel 15 is kept in a state that a rotation thereof is prohibited by the fixed barrel 11. Moreover, the linear-movement barrel 15 is straightly movable in an optical-axis direction. The rear rotational barrel 16 is rotatably retained on a peripheral surface of the linear-movement barrel 15.

A male helicoid 23 is formed at a peripheral rear end of the rear rotational barrel 16. The male helicoid 23 meshes with a female helicoid 24 formed on an inner surface of the fixed barrel 11. By transmitting a rotational force from a lens-driving motor, the rear rotational barrel 16 is moved while rotating relative to the fixed barrel 11. In association with the rear rotational barrel 16, the linear-movement barrel 15 is moved in the optical-axis direction. The rotational force of the lens-driving motor is transmitted to a columnar gear 25 via a reduction gear train (not shown). The columnar gear 25 meshes with a gear portion 26 of the rear rotational barrel 16 through an opening of the fixed barrel 11 so as to make the rear rotational barrel 16 move in the optical-axis direction.

Figure 3:
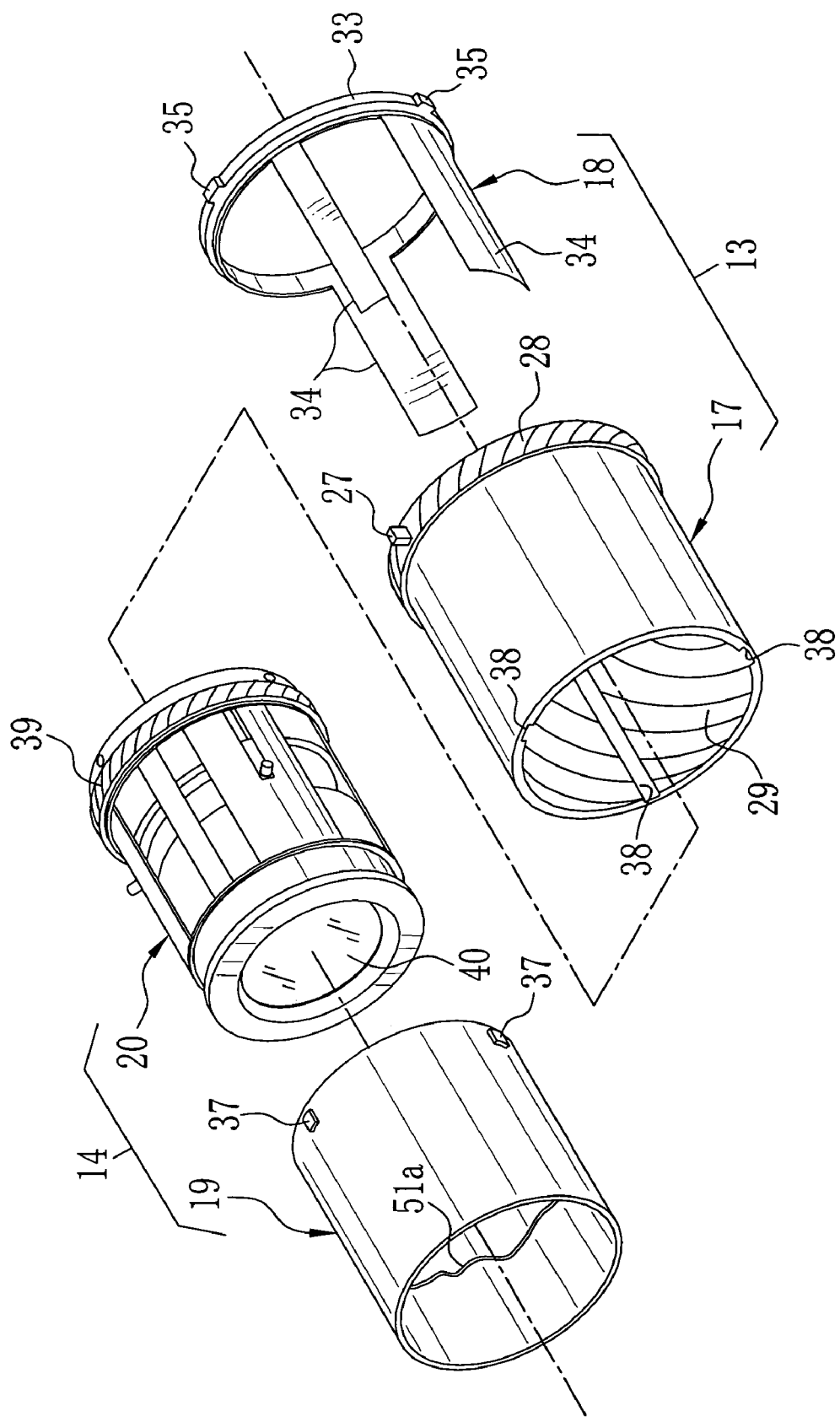
FIG. 3 is an exploded perspective view showing a middle barrel and a front barrel.

In FIG. 3, the middle rotational barrel 17 is provided with a key projection 27 and a male helicoid 28 formed at a peripheral rear end. An inner surface of the middle rotational barrel 17 is formed with a female helicoid 29. The male helicoid 28 meshes with a female helicoid 30 formed on an inner surface of the linear-movement barrel 15. The key projection 27 engages with a key groove 32, which is formed on an inner surface of the rear rotational barrel 16, through a slot 31 formed in the linear-movement barrel 15. The key projection 27 transmits the rotation of the rear rotational barrel 16 to the middle rotational barrel 17. By utilizing the rotation of the rear rotational barrel 16, the middle rotational barrel 17 moves in the optical-axis direction so as to be led by means of the male helicoid 28 and the female helicoid 30.

The linear-movement guide member 18 is rotatably retained by the middle rotational barrel 17. The linear-movement guide member 18 comprises a ring portion 33 and linear-moving keys 34 protruding in the optical-axis direction. Key projections 35 are formed at the periphery of the ring portion 33. The key projection 35 engages with a key groove 36, which is formed on an inner surface of the linear-movement barrel 15, to prevent the linear-movement guide member 18 from rotating. The linear-movement key 34 engages with the leading barrel 20 inside the middle rotational barrel 17 to prevent the leading barrel 20 from rotating. The linear-movement key 34 moves in the optical-axis direction together with the middle rotational barrel 17.

The cam barrel 19 is retained so as to be rotatable around the periphery of the leading barrel 20. Key projections 37 are formed on the outside of the cam barrel 19. The key projection 37 engages with a key groove 38 formed on an inner surface of the middle rotational barrel 17 to transmit the rotation of the middle rotational barrel 17 to the cam barrel 19. A male helicoid 39 is formed at a peripheral rear end of the leading barrel 20. The male helicoid 39 meshes with the female helicoid 29 formed on the inner surface of the middle rotational barrel 17. The leading barrel 20 moves in the optical-axis direction so as to be led by means of the male helicoid 39 and the female helicoid 29 in a state that the linear-movement guide member 18 prevents the leading barrel 20 from rotating.

Figure 4:
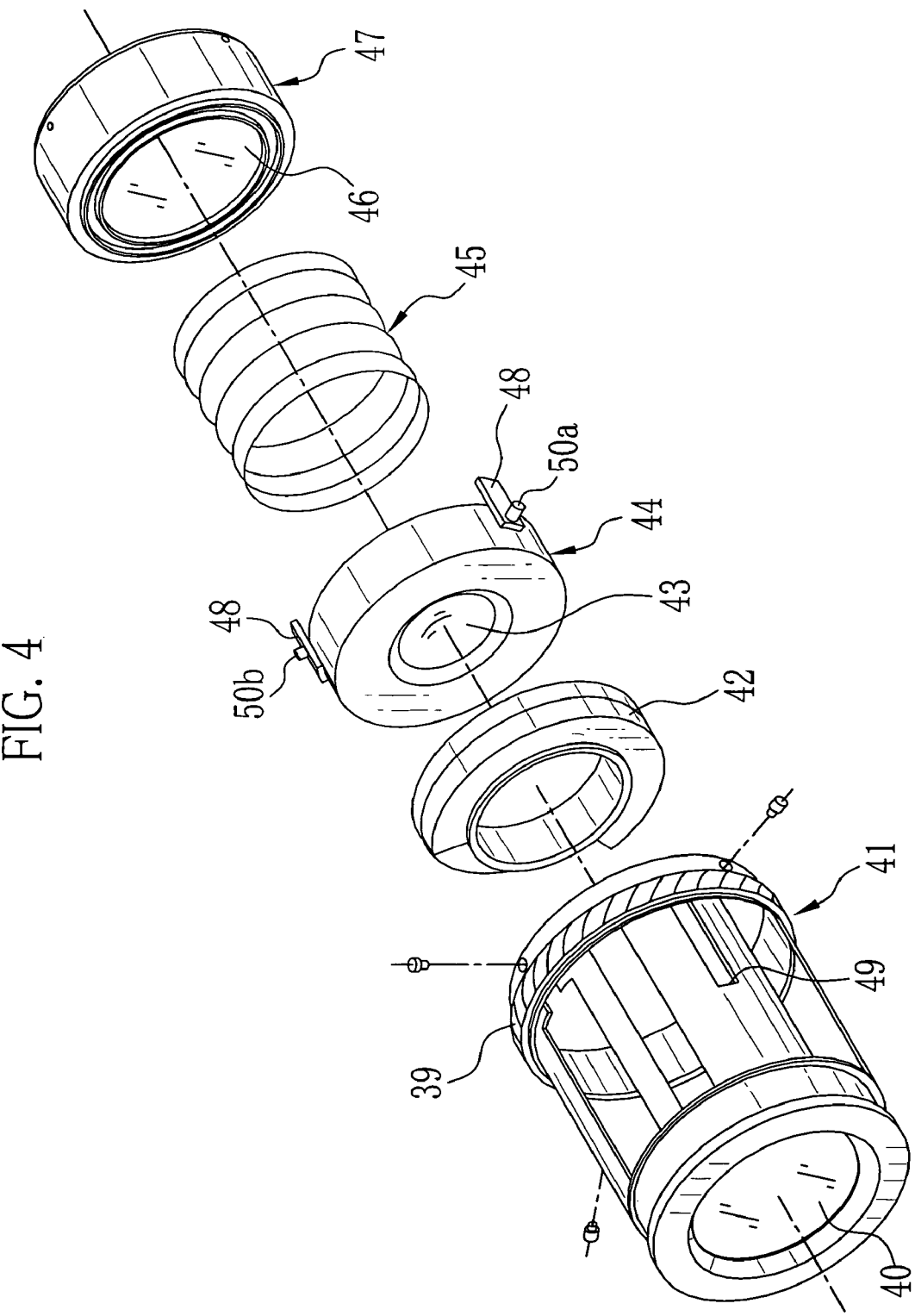
FIG. 4 is an exploded perspective view showing a leading barrel.

In FIG. 4, the leading barrel 20 is constituted of a lens frame 41, a shutter block 42, a movable lens holder 44, a spring 45, and a fixed lens holder 47. A first lens 40 is fixed to the top of the lens frame 41. The shutter block 42 contains a shutter blade. The movable lens holder 44 holds a second lens 43. The fixed lens holder 47 holds a third lens 46. The movable lens holder 44 is attached to the shutter block 42 and is fitted to the lens frame 41. The fixed lens holder 47 is securely attached to the end of the lens frame 41. The spring 45 is disposed between the movable lens holder 44 and the fixed lens holder 47 to urge the movable lens holder 44 toward the first lens 40 by a compression elastic force thereof.

Figure 5:
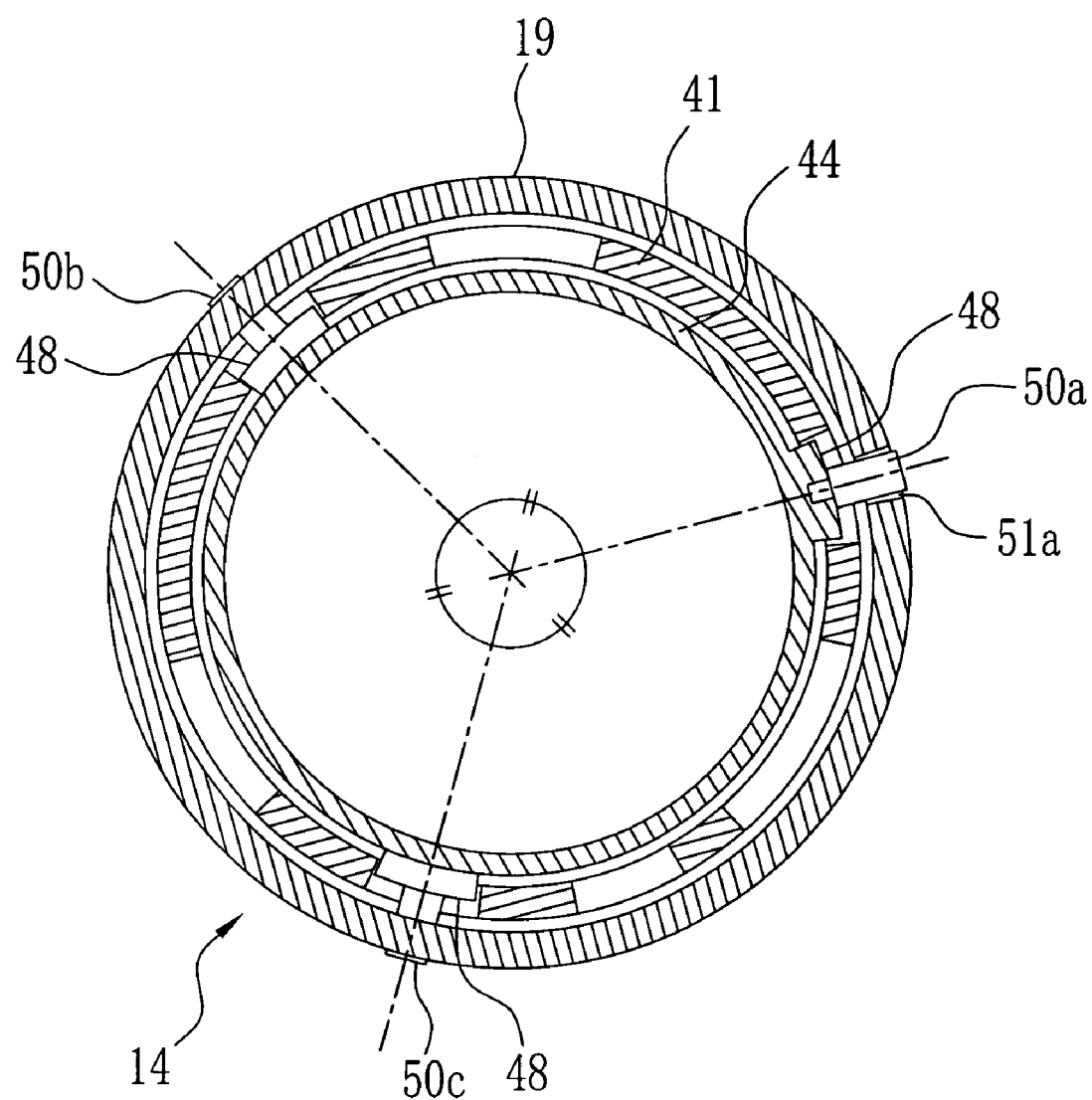
FIG. 5 is a section view of the front barrel.

Such as also shown in FIG. 5, the periphery of the movable lens holder 44 is provided with three sliders 48 positioned at 120-degree intervals. The respective sliders 48 engage with each of three guide openings 49 formed in the lens frame 41. The guide opening 49 guides the movable lens holder 44 to move straight relative to the lens frame 41 in the optical axis direction. Cam followers 50a to 50c are attached to the sliders 48 respectively.

Figure 6:
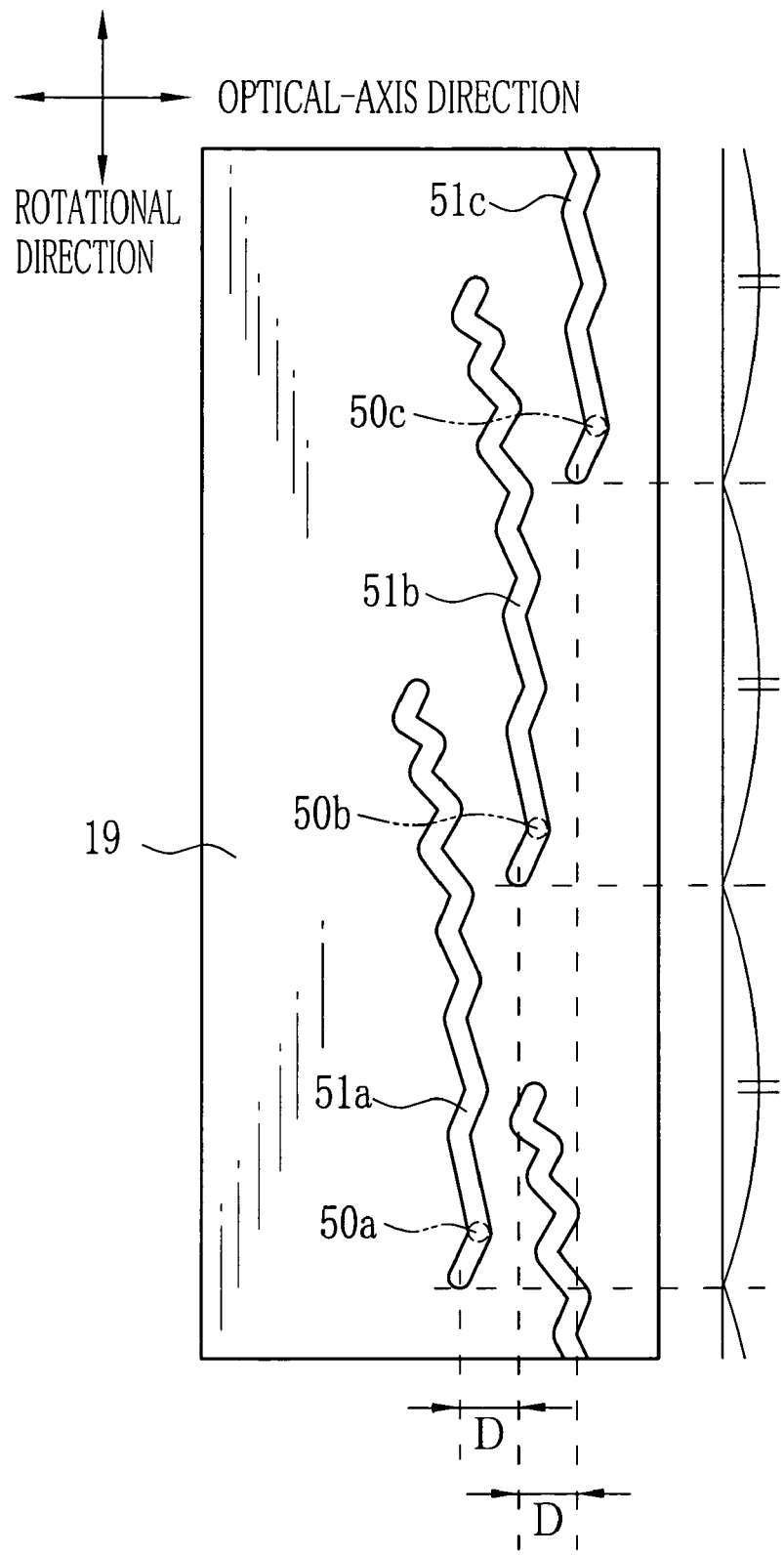
FIG. 6 is a development of a cam barrel.
Figure 7:
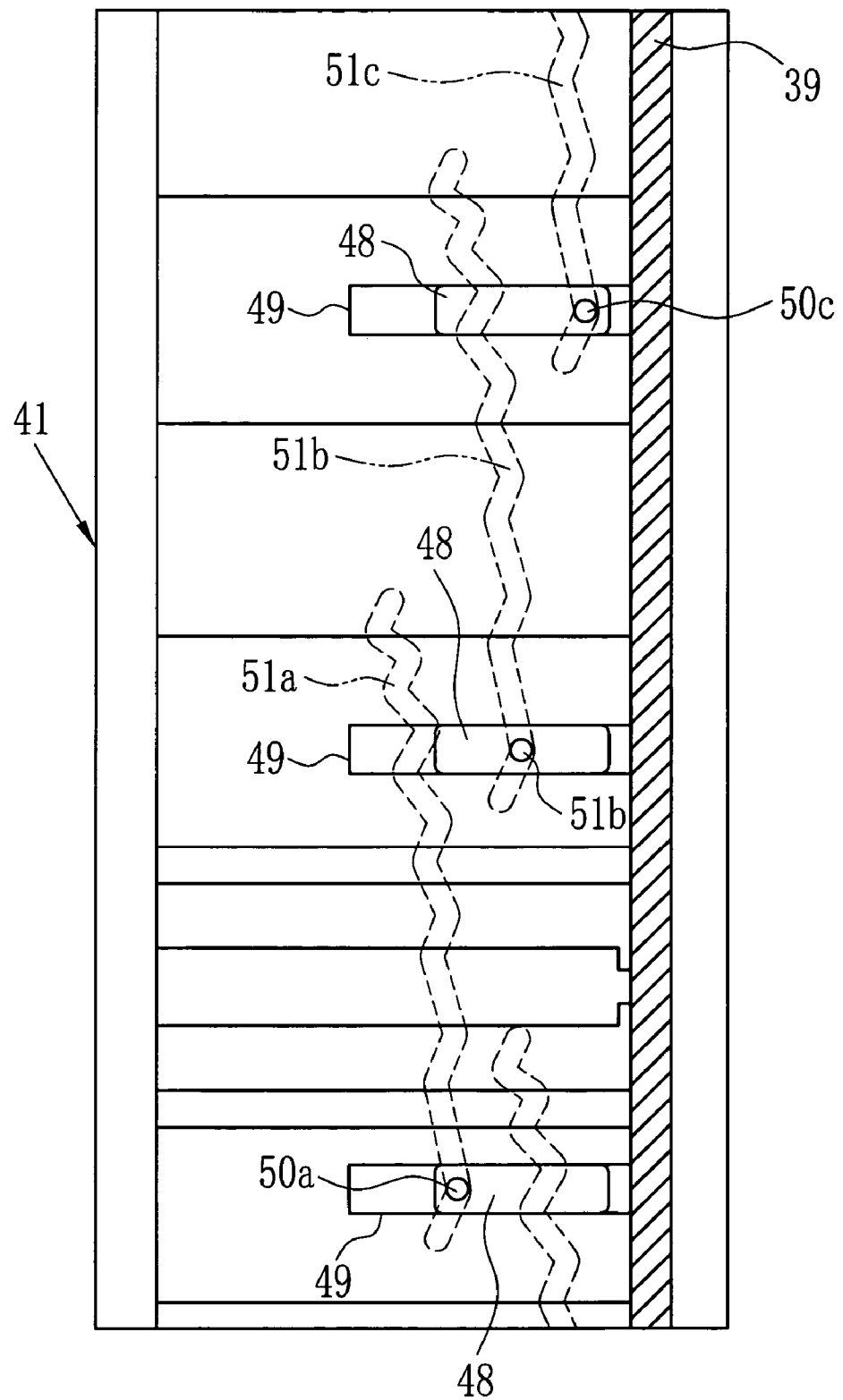
FIG. 7 is a development of the leading barrel.

In FIGS. 6 and 7, the cam barrel 19 is formed with three cam grooves 51a to 51c having an identical zigzag shape. The cam grooves 51a to 51c are formed at 120-degree intervals in a rotational direction of the cam barrel 19. Further, the cam grooves 51a to 51c are formed at constant intervals D in the optical axis direction. In order to perform the well-known step zooming, the cam grooves 51a to 51c for moving the lens holder 44 have the zigzag shape in which a zooming region and a focusing region are alternately arranged. Thus, while the cam barrel 19 is rotated, a certain focal length is set, and in this focal length, focusing is performed. Upon further rotating the cam barrel 19, the focal length is changed stepwise, and then the focusing is performed.

The cam follower 50a is disposed so as to be nearest to the front end of the lens barrel 10 and engages with the cam groove 51a. The cam follower 50c is disposed so as to be nearest to the rear end of the lens barrel 10 and engages with the cam groove 51c. The cam follower 50b is disposed between the cam followers 50a and 50c to engage with the cam groove 51b. Since the cam followers 50a to 50c are disposed at three places of the periphery of the movable lens holder 44 so as to be shifted in the optical axis direction, it is possible to shift the positions of the cam grooves 51a to 51c in the optical-axis direction and in the rotational direction of the cam barrel 19. Routes of the cam surface, along which the cam followers 50a to 50c move, are prevented from overlapping with each other so that the cam grooves 51a to 51c are prevented from interfering with each other.

The rotation of the middle rotational barrel 17 is transmitted to the cam barrel 19 to rotate the cam barrel 19 around the optical axis. Hereupon, displacement of each of the cam grooves 51a to 51c is transmitted to the cam followers 50a to 50c respectively. The movable lens holder 44 is regulated by the sliders 48 and the guide openings 49 so as not to move in the rotational direction. Consequently, the movable lens holder 44 moves in the optical-axis direction stepwise at intervals of zoom positions, which are set between a wide-angle end and a telephoto end. In this way, a focus is adjusted in accordance with a subject distance.

The lens-driving motor is activated to rotate the columnar gear 25. By rotating the columnar gear 25, the respective barrels of the lens barrel 10 are advanced from an initial state in that the fixed barrel 11 completely contains the rear barrel 12, the middle barrel 13 and the front barrel 14. The rotation of the columnar gear 25 is transmitted to the rear rotational barrel 16. Thereupon, the rear rotational barrel 16 advances while rotating inside the fixed barrel 11 by means of the mail and female helicoids 23 and 24. In association with the advance of the rear rotational barrel 16, the linear-movement barrel 15 moves straight to advance the middle barrel 13. The rotation of the rear rotational barrel 16 is transmitted to the middle rotational barrel 17 so that the middle rotational barrel 17 advances while rotating in virtue of the male and female helicoids 28 and 30.

The linear-movement guide member 18 is advanced together with the middle rotational barrel 17. At this time, the linear-movement guide member 18 advances while regulated by the linear-movement barrel 15. When the middle rotational barrel 17 is rotated, the leading barrel 20 regulated by the linear-movement guide member 18 is advanced together with the cam barrel 19 so as to be led by the male and female helicoids 39 and 29. Since the rotation of the middle rotational barrel 17 is transmitted to the cam barrel 19, the cam barrel 19 is rotated relative to the leading barrel 20. At this time, the displacement of each of the cam grooves 51a to 51c is transmitted to the respective cam followers 50a to 50c. In association with this, the movable lens holder 44 moves in the optical-axis direction.

The lens barrel 10 is driven up to the respective zoom positions, which are set between the wide-angle end and the telephoto end. The rear barrel 12, the middle barrel 13 and the front barrel 14 are moved in accordance with the respective zoom positions. Also at the time of focusing, the columnar gear 25 is driven to slightly move the rear barrel 12, the middle barrel 13 and the front barrel 14 in accordance with a focus point. At this time, in virtue of the rotation of the cam barrel 19, the displacement of the respective cam grooves 51a to 51c are transmitted to the respective cam followers 50a to 50c engaging therewith. Thus, the movable lens holder 44 regulated by the lens frame 41 is moved in the optical-axis direction by means of the slider 48 and the guide opening 49 to adjust the focus.

In the above embodiment, the lens barrel is constructed in the three-step advancement manner. However, this manner is not exclusive. The present invention may be applicable to another lens barrel, which is constructed in a two-step advancement manner. Further, the present invention may be applicable to the other lens barrel in which only the front barrel is advanced. Incidentally, the forms of the cam follower and the cam groove may be properly modified.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens barrel comprising:
   a cam barrel for rotating around an optical axis;
   a plurality of cam grooves formed in said cam barrel, said cam grooves having an identical form, and positions thereof being shifted in a rotational direction and in an optical-axis direction respectively;
   a plurality of cam followers engaging with said cam grooves respectively;
   a movable member provided with said cam followers; and
   a guide member for guiding each cam follower pressed by each cam groove when said cam barrel is rotated, such that said cam follower is moved in said optical-axis direction without revolving.

2. A lens barrel according to claim 1, wherein said movable member has a ring shape and a first lens is attached to the inside thereof.

3. A lens barrel according to claim 2, wherein said cam grooves are formed at regular intervals in said rotational direction.

4. A lens barrel according to claim 3, wherein said cam grooves are formed at constant intervals in said optical-axis direction.

5. A lens barrel according to claim 4, wherein said cam grooves have a zigzag shape.

6. A lens barrel according to claim 5, wherein a number of said cam grooves is three, and said cam grooves are formed at 120-degree intervals in said rotational direction.

7. A lens barrel according to claim 2, wherein said guide member is a guide opening extending in said optical-axis direction and said guide opening is formed in a frame member, which is disposed inside said cam barrel so as to be movable in said optical-axis direction, said frame member movably containing said movable member.

8. A lens barrel according to claim 7, wherein a peripheral surface of said movable member is provided with sliders, which are slidably fitted to said guide openings and on which said cam followers are fixed.

9. A lens barrel according to claim 8, wherein said frame member holds a second lens behind which said first lens is moved in the optical-axis direction to perform zooming and focusing.

* * * * *